United States Patent [19]

Miksitz

[11] E Re. 29,386

[45] Reissued Sept. 6, 1977

[54] GRAVITY DISCHARGE APPARATUS

[75] Inventor: Frank J. Miksitz, Phillipsburg, N.J.

[73] Assignee: Alfred L. Miksitz, Bethlehem, Pa.

[21] Appl. No.: 684,190

[22] Filed: May 7, 1976

Related U.S. Patent Documents

Reissue of:

[64] Patent No.: 3,874,566
Issued: Apr. 1, 1975
Appl. No.: 467,558
Filed: May 6, 1974

U.S. Applications:

[63] Continuation-in-part of Ser. No. 216,105, Jan. 7, 1972, Pat. No. 3,809,286.

[51] Int. Cl.[2] ..... B65D 83/06

[52] U.S. Cl. ..... 222/404

[58] Field of Search ..... 222/404, 409, 410, 411; 214/17 D; 259/37; 34/168

[56] References Cited

U.S. PATENT DOCUMENTS

| | | | |
|---|---|---|---|
| 3,403,895 | 10/1968 | Hatfield et al. | 34/168 |
| 3,809,286 | 5/1974 | Miksitz | 222/404 X |

*Primary Examiner*—Robert B. Reeves
*Assistant Examiner*—John P. Shannon
*Attorney, Agent, or Firm*—Cushman, Darby & Cushman

[57] ABSTRACT

Granular material is fed downwardly in a stream of controlled rate from a bin or the like by means of a horizontal apertured plate moving in a horizontal orbital path beneath a fixed shroud which is disposed within the mass of material in the bin.

12 Claims, 10 Drawing Figures

GRAVITY DISCHARGE APPARATUS

Matter enclosed in heavy brackets [ ] appears in the original patent but forms no part of this reissue specification; matter printed in italics indicates the additions made by reissue.

RELATED APPLICATION

This is a continuation-in-part of prior application Ser. No. 216,105, filed Jan. 7, 1972, now U.S. Pat. No. 3,809,286, the subject matter of which is incorporated herein by reference.

This invention relates to methods and apparatus for effecting gravity assisted flow of granular material and, in particular, to methods and apparatus for the controlled feed of granular material from an upper zone into a lower zone.

The prior application discloses an apparatus in which the feeding or discharging of granular material from a mass thereof is effected and closely controlled by a special arrangement of a centrally apertured horizontal feed plate disposed below a fixed shroud or baffle located within the mass of material. The disposition of the shroud is such that the granular material does not flow spontaneously by gravity through the apertured feed plate when the latter is stationary. However, the granular material does flow spontaneously to an extent into the periphery of the space directly below the shroud where it comes to rest in the form of an annular mass of material of which at least a portion resides on the upper surface of the plate. Thereafter, the plate is driven in an orbital path about a vertical axis with the result that granular material on the plate is carried inwardly with respect to the vertical axis of the shroud. As this occurs an additional quantity of material flows by gravity from the main mass into the space formerly occupied by the displaced quantity thereby preventing reverse displacement of the initially displaced quantity during continued orbital movement. Rather, the feed plate moves relative to the initially displaced material so that an edge portion of the aperture in the plate moves under this material which then passes through the aperture by gravity. The overall result is that granular material is continuously fed downwardly through the feed plate along a path which moves in a circle, the flow of material being proportional to the speed of the plate.

SUMMARY OF THE INVENTION

It has been found that under some circumstances it is necessary for the feed plate in an apparatus of the kind described above to reach out beyond the periphery of the shroud in order for it to perform a proper feeding or discharging operation. This may be necessary, for example, if the granular material has little or no tendency to flow inwardly under the shroud. This condition may be present if the material is finely-divided and non-free-flowing as may be the case with especially cohesive or sticky substances. The condition may also result if the material contains lumps which are of large size relative to the vertical distance between the shroud and the feed plate. For example, some powders which are readily free-flowing once they are put in motion tend to form arches within the mass of powder when a portion of the material is removed by gravity through a feed or discharge aperture with the result that flow through the aperture will be intermittent or cease altogether. In the case of chunky material containing lumps of irregular size and shape, the material may wedge between the shroud and the feed plate and impede or prevent flow of the material.

Another aspect of the present invention is the provision of a ring-shaped feed plate having a central hole which is larger than a feed hole in a horizontal shelf or wall over which the feed plate is mounted. In this construction, orbital movement of the feed plate displaces the granular material inwardly toward its center in the manner described above but instead of falling by gravity through the hole in the feed plate the material is first deposited on the shelf and is subsequently pushed over the edge of the feed hole in the latter by continued orbital movement of the feed plate. This arrangement permits a smaller area of contact between the lower surface of the feed plate and the shelf and thereby reduces friction at this location. The same is true with respect to reduced friction between the upper surface of the feed plate and the mass of granular material. In addition, the feed plate tends to remain buried by the granular material, and this is advantageous in protecting the feed plate from any corrosive atmosphere which may be present. This type of feed plate may have a diameter either greater or smaller than the shroud.

It is a further feature of the invention to provide a shrouded orbital feed plate type of apparatus adapted to feed granular material, such as an aerated powder, which would normally be so free-flowing as to pass under the shroud and though the feed aperture even without movement of the plate. This may be accomplished by providing the upper surface of the feed plate with an inclined annular dam which projects upwardly toward the shroud a distance sufficient to prevent free flow of the granular material when the plate is not moving. The feed plate may have a diameter larger or smaller than the shroud.

It is a further feature of the invention to provide a special purpose granular material feeding device which does not require the presence of a shroud above an apertured orbital feed plate. This type of apparatus is suitable for feeding granular material which has such a strong tendency to form an arch above an aperture that it will not flow spontaneously through the aperture. Orbital movement of the feed plate continuously breaks the arch and permits gravity flow of the material.

Throughout this description orbital movement of a feed plate means that the plate moves in generally a circular path either with or without rotation about its own axis. When there is no rotation of the plate about its own axis, all points on the plate move in circular paths of the same radius which is small compared to the radius of the plate. When the plate also rotates about its own axis, the plate moves generally as if its circumference were rolling along the inside of a ring of slightly greater diameter than the plate. These are the same movements disclosed in the aforesaid application Ser. No. 216,105. It is immaterial to the invention what form of drive means is employed to effect either form of movement.

By granular material is meant any solid or semi-solid material in the form of discrete particles, grains or lumps without regard to size or density so long as the material can be made to flow downwardly by gravity when acted on by the feed plate. The term encompasses all types of finely divided material including ground cement, as well as larger particulate matter, such as sand, stone and coal.

DETAILED DESCRIPTION OF EMBODIMENTS

The invention will be further understood from the following more detailed description taken with the drawings in which:

FIG. 1 is a vertical sectional view of a feed apparatus embodying an orbital feed plate which extends beyond its shroud and which has a feed aperture of greater diameter than the discharge aperture in the bottom of the apparatus;

FIGS. 2 and 3 are sectional views taken on the lines 2—2 and 3—3, respectively, of FIG. 1;

Figure 1:
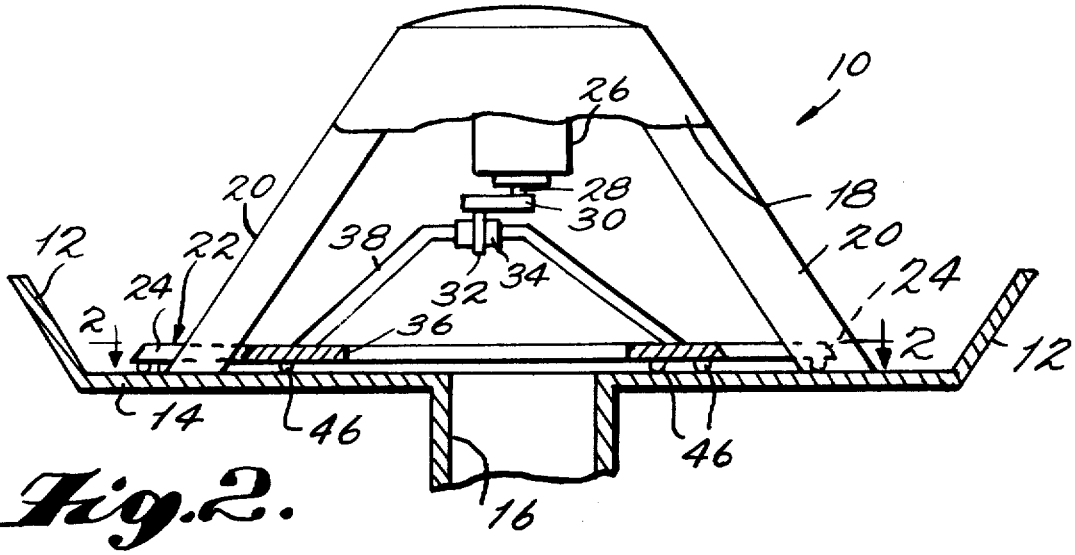
Figure 2:
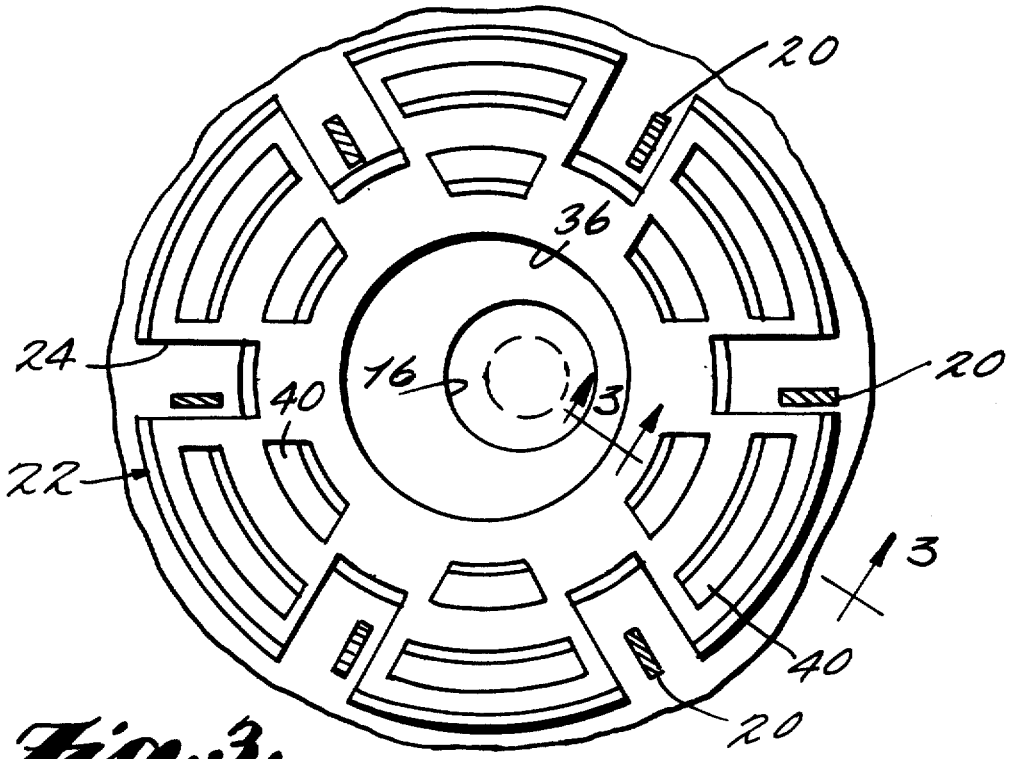
Figure 3:
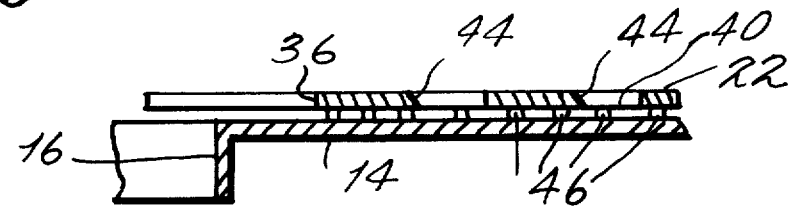

Referring to FIGS. 1, 2 and 3, there is shown a feed apparatus 10 located in the lower tapered end of a bin, silo or other vessel, defined by inclined side walls 12 and a horizontal shelf 14 or bottom wall, the latter including a circular discharge aperture 16. The feed apparatus 10 includes a generally frustoconical shroud 18 which is supported by a plurality of legs 20 in a position above and axially aligned with the aperture 16. A generally circular feed plate 22 of greater diameter than the shroud 18 is slidably supported on the bottom wall 14 below the shroud 18. The periphery of the feed plate 22 is notched as shown at 24 to receive the legs 20 which support the shroud 18.

The feed plate 22 is driven with the aforesaid orbital movement by any suitable means such as an electric motor 26 supported by the shroud 18 in a position such that the motor shaft 28 is coaxial with the discharge aperture 16. A horizontal crank arm 30 is fixed to the motor shaft 28 and carries at its outer end a fixed depending stub shaft 32 which is parallel to the motor shaft 28. The shaft 32 fits into a bearing 34 which is disposed coaxially above a centrally located circular feed aperture 36 in the feed plate 22. The bearing 34 is fixed with respect to the feed plate by legs 38 which are rigidly connected to the upper surface of the feed plate 22 and to the casing of the bearing.

To reduce friction between the upper surface of the feed plate 22 and the granular material and between the lower surface of the plate 22 and the shelf 14, the plate 22 may be slotted as shown at 40 to reduce the area of contact. However, since the feeding function of the plate 22 depends on friction between the plate 22 and the granular material, the design of the plate 22 will vary with the type of material being handled. In some instances, it may be desirable to increase friction by providing a plurality of small upwardly directed cleats or the like (not shown) on the upper surface of the plate 22 near the periphery thereof. To reduce the power required to drive the plate 22 into the granular material the outwardly facing edges of the plate 22 and of the slots 40 should be chamfered as shown at 42 and 44, respectively. However, the inwardly facing edges of the feed aperture 16 and the slots 40 should be vertical to aid in gripping the granular material. The peripheral edge of the plate 22 may be smoothly circular, as shown, or it may be uneven as by the provision of horizontal toothlike projections.

The lower surface of the feed plate 22 may be flat or as illustrated in FIGS. 1 and 3, it may be provided with a plurality of short stud-like elements 46 which engage the shelf 14 and thereby support the plate 22 slightly above the shelf 14. The illustrated construction is effective in preventing the build-up or pulverized material between the plate 22 and the shelf 14. It has been found, for example, that in feeding coal the finer particles tend to accumulate under the plate 22 and force it upwardly with resulting misalignment and damage to the elements of the drive system, if the stud-like elements or their equivalent are not present.

In operation of the apparatus of FIGS. 1, 2 and 3, the crank arm 30 which is fixed to the motor shaft 28 is driven by the latter at a low rpm to impart orbital movement of the feed plate 22 through the interaction of the off-set stud shaft 32 on the bearing 34. Frictional forces on the feed plate 22 tend to cause the latter to roll or rotate about its own axis, that is, the axis of the bearing 34. However, this rotation is prevented by engagement of the walls of the notches 24 with the legs 20. The orbital movement causes a peripheral portion of the feed plate 22 to reach out into the granular material beyond the shroud 18 and to then move inwardly to drag granular material to a position under the shroud 18. The material may tend to form an arch from the base of the shroud to the bottom of the bin, but the feed plate 22 breaks the heel of the arch. This differs from the conditions present when a feed plate always remains wholly under its shroud, because in the latter case the granular material is relatively unconsolidated for the reason that it has flowed by gravity into the form of an annular mass disposed under the shroud. The extended form of feed plate 22 also performs the very important function of breaking the heel of any arch which might form in the granular material as a result of the non-free-flowing characteristics of the latter. As pointed out previously, some granular materials which are free-flowing when agitated are sufficiently cohesive that they tend to form an arch extending across an aperture through which they are flowing by gravity. The arch can, of course, be broken by mechanical agitation of the material, and this is the effect of the feed plate 22 as it penetrates into the material. During continued orbital movement of the feed plate 22 the granular material which has been dragged under the shroud 18 moves across the upper surface of the feed plate 22, is deposited on the shelf 14 and is then pushed over the edge of the discharge aperture 16 in the latter in the form of a continuous stream. The locus of the path of the falling material continuously moves around the periphery of the aperture 16, as described previously. The mass rate of flow through the aperture for a given set of conditions varies only with the speed of the feed plate 22.

If the discharge aperture 16 in the shelf 14 were larger than the feed aperture 36 in the feed plate 22, the granular material would be fed continuously through the aperture 36 in a path moving around the periphery of the latter. In the illustrated embodiment, the feed plate 22 has been designed purposely with a relatively large feed aperture 36 in order to reduce friction by reducing the distance which the granular material must move across the feed plate 22. The smaller annular area of the feed plate 22 will normally be covered with the granular material and this is beneficial in shielding the feed plate 22 from any high temperature or corrosive atmosphere which may be present.

Figure 4:
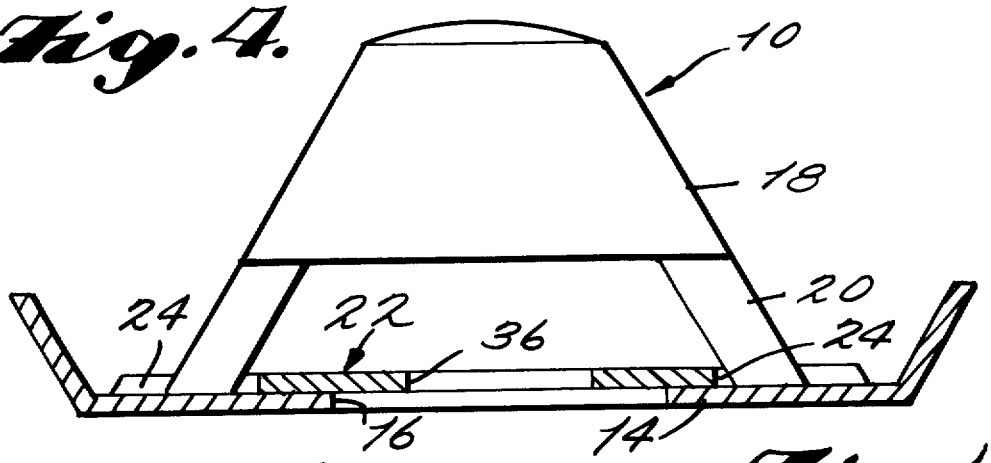
FIG. 4 is a vertical sectional view of a feed apparatus embodying an orbital feed plate which extends beyond its shroud and which has a feed aperture of lesser diameter than the discharge aperture in the bottom of the appartus.

FIG. 4 illustrates a feed apparatus 10 which includes a circular orbital feed plate 22 having a larger diameter than its shroud 18 and having a feed aperture 36 of smaller diameter than the discharge aperture 16 in the shelf 14 of the bin. The other elements (not shown) and the operation are the same as previously described with respect to FIGS. 1, 2 and 3, except that the granular material falls directly through the feed aperture 36 rather than first being deposited on the shelf.

Figure 5:
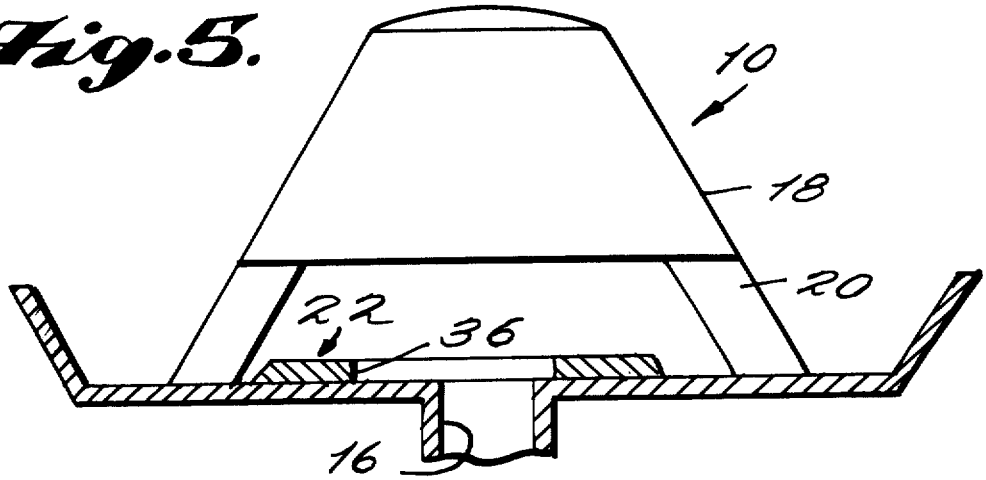
FIG. 5 is a vertical sectional view of a feed apparatus embodying an orbital and rolling feed plate which remains within its shroud and which has a feed aperture of greater diameter than the discharge aperture of the apparatus.

FIG. 5 illustrates a feed apparatus 10 which includes a circular orbital and rolling feed plate 22 having a smaller diameter than its shroud and having a feed aperture 36 of greater diameter than the discharge aperture 16 in the shelf 14. The feed plate is free to rotate about its own axis during orbital movement. The other elements (not shown) and its operation are as described above.

Figure 6:
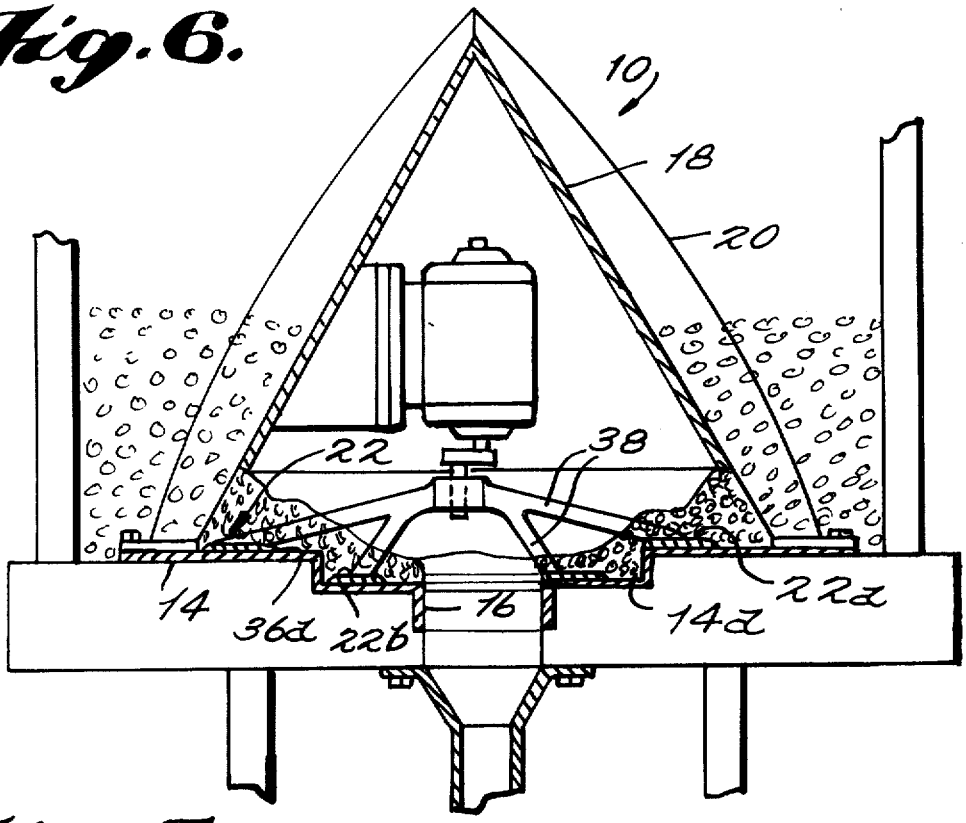
FIG. 6 is a vertical sectional view of a feed apparatus embodying a double concentric orbital and rolling feed plate similar to that shown in FIG. 5.

FIG. 6 illustrates a feed apparatus 10 which includes a two-part orbital and rolling feed plate 22 similar in structure and operation to that shown in FIG. 5. The feed plate 22 includes an annular outer part 22a and a concentric annular inner part 22b constructed with common legs 38 so that the parts 22a and 22b move together. The shelf 14 is stepped as shown at 14a and the lower central circular portion thereof is provided with the discharge aperture 16. The diameter of the feed aperture 36a in the outer plate part 22a is greater than the diameter of th stepped-down portion of the shelf 14, and the diameter of the feed aperture 36b in the inner plate part 22b is greater than the diameter of the discharge aperture 16. In operation of the device, granular material passes over the plate part 22a onto the upper portion of the shelf 14, is pushed over the step 14a onto the lower portion of the shelf, passes over the lower plate part 22b to be again deposited on the lower portion of the shelf 14, and is then pushed over the edge of the discharge aperture 16.

Figure 7:
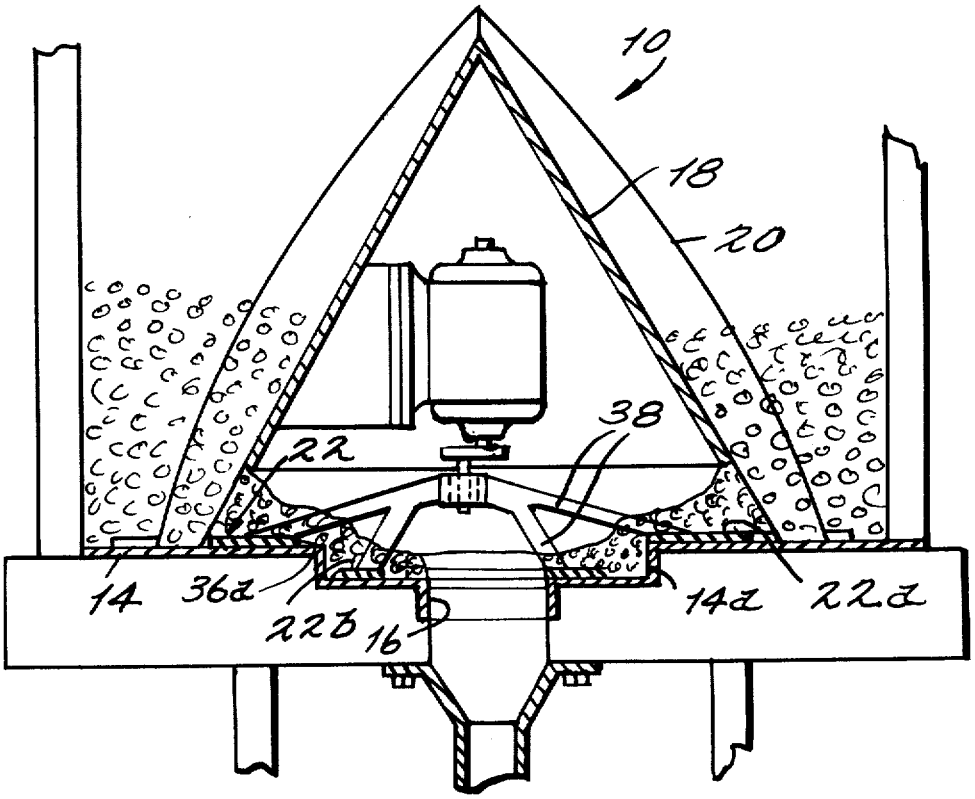
FIG. 7 is a vertical sectional view of a feed apparatus embodying a double concentric orbital feed plate.

FIG. 7 illustrates a feed apparatus 10 which includes a two-part orbital feed plate embodying some of the features of FIGS. 1 and 6. The outer feed plate part 22a is of greater diameter than the shroud 18, while the outer features of the apparatus are as shown in FIG. 6.

Figure 8:
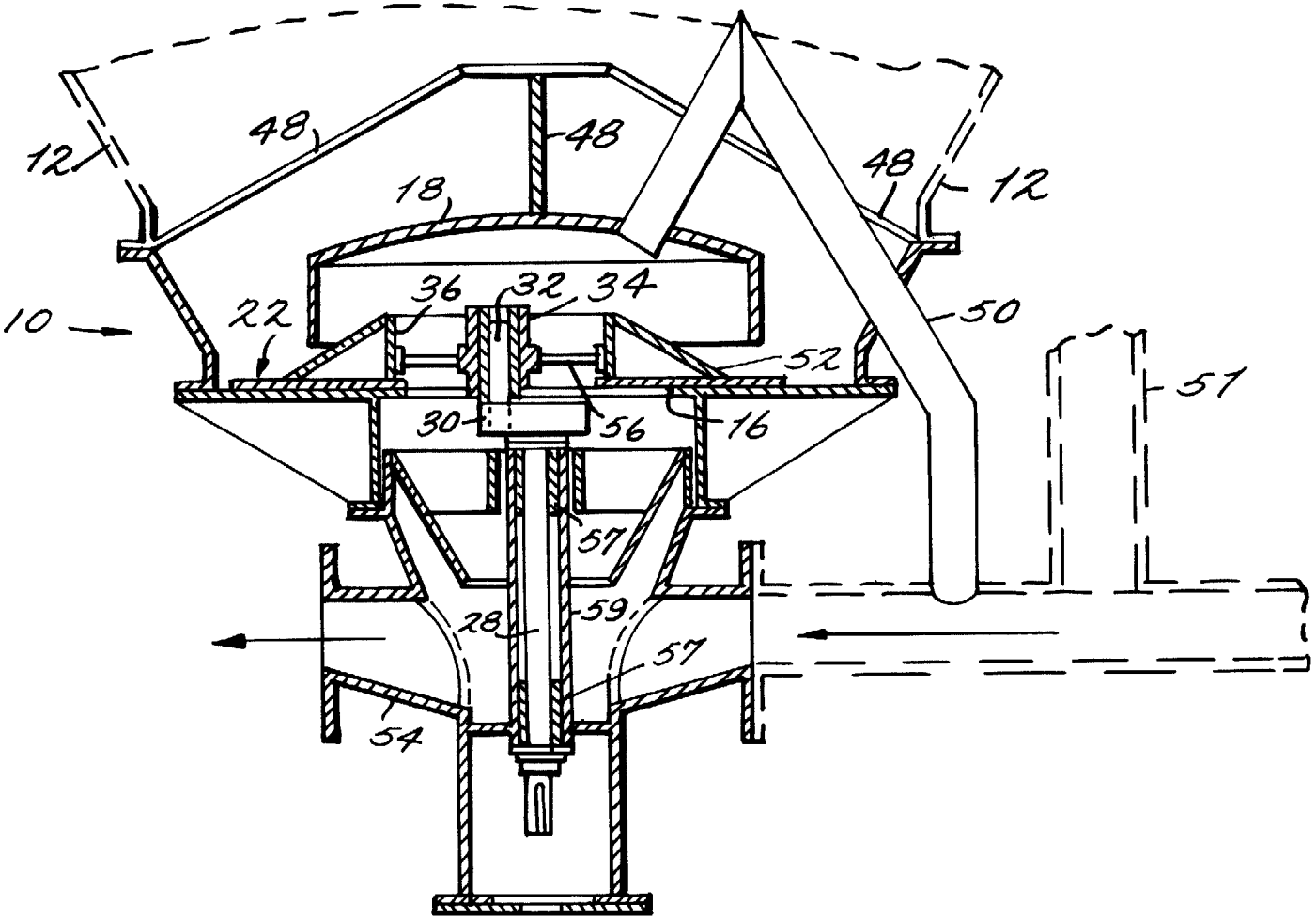
FIG. 8 is a vertical sectional view of a feed apparatus embodying a special-purpose feed plate which includes an inclined annular dam on its upper surface.

FIG. 8 illustrates a feed apparatus 10 which is especially adapted for feeding granulated or powdered material into, for example, a pneumatic conveyor conduit. In this embodiment, the shroud 18 is shown as being supported from above by suitable brace members 48 attached to the side walls 12 of the bin. In feeding a pneumatic conveyor conduit the material which spontaneously flows inwardly under the shroud may become aerated or partially fluidized by adventitious pressure fluctuations in the system; in such instance the aerated material might flow through the discharge aperture 16 at irregular or uncontrolled rates if not prevented from doing so. The feed plate 22 is constructed with an annular dam 52 which surrounds the feed aperture 36 and which is inclined downwardly and radially outwardly as shown. The upper edge of the dam 52 is above the lower edge of the shroud and thereby blocks the spontaneous or uncontrolled flow of powdered material into the feed aperture 36. In some cases the dam may extend upwardly to a point below the lower edge of the shroud. In either case, upon orbital movement of the feed plate 22, the material will be urged over the dam 52 so as to pass through the apertures 36 and 16 into a pneumatic conveyor conduit 54 through which a stream of air is passing in a leftward direction.

The conveying air passing the point of discharge can cause a lowered pressure at that point due to a siphoning effect of the high velocity air stream. This may cause pressure disturbances near the feed plate 22 with resultant fluidization of the material. To equalize pressure and prevent such pressure disturbances a conduit can connect the region under the shroud to the pneumatic conveying line in order to maintain the pressures about equal at these two locations. Such a pressure-equalization conduit should be constructed essentially vertically thereby avoiding horizontal sections where granular material may tend to build up. As shown, a conduit 50 leads from the upstream portion of the conveyor conduit 54 into the area just below the upper end of th shroud. A second conduit 51 terminates in the top of the bin. A secondary benefit of the conduits 50 and 51 is momentary aeration caused by pressure fluctuations which would promote flow and minimize the possibility of hang-up of material.

In many cases in which the present invention is used to feed cohesive or non-free-flowing material it may often be desirable to include in the bin or hopper aeration nozzles or jets to inject air or other gas into the mass of material, thereby rendering it free flowing; this may also be accomplished by causing the bin or hopper, or even the shroud of the feeder, to vibrate at a suitable frequency. Such gas injection or vibration may cause the material to flow through the discharge aperture 16 at irregular and uncontrolled rates. In such instances an annular dam 52 as shown in FIG. 8 on feed plate 22 may be incorporated into any of the devices of FIGS. 1 through 8 to block the spontaneous or uncontrolled flow of granular or powdered material into the feed aperture 36 or the discharge aperture 16.

In the FIG. 8 embodiment the drive system is located below the feed plate 22. The bearing 34 is disposed centrally within the feed aperture 36 and is connected to the feed plate 22 by a suitable spider 56. The drive shaft 28 is supported by bearings 57 within a sleeve 59.

Figure 9:
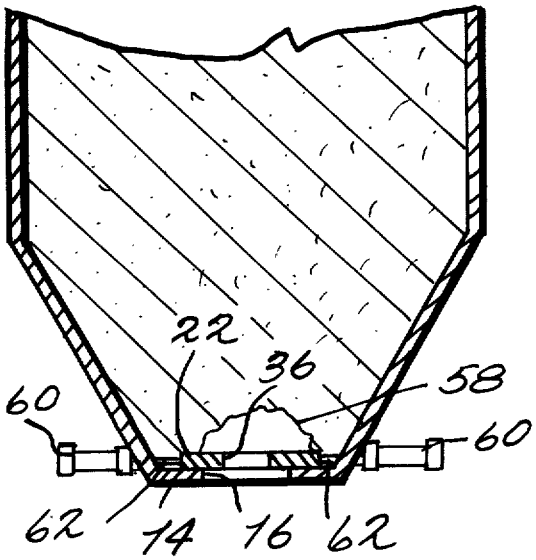
FIGS. 9 and 10 are vertical sectional views of feed apparatus embodying special-purpose orbital or rolling feed plates which operate without shrouds.
Figure 10:
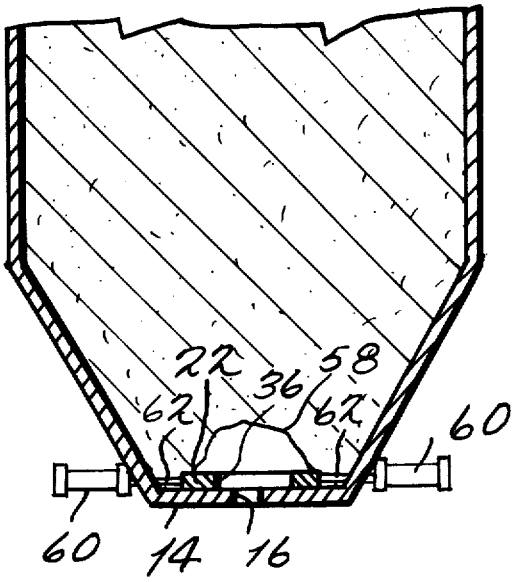

FIGS. 9 and 10 illustrate special-purpose feed apparatus in which orbital or rolling feed plates 22 operate withou the use of shrouds. In this embodiment the granular material is so cohesive as to be essentially nonflowable because of the formation of an arch 58 above the discharge aperture 16. Orbital movement of the feed plate 22 breaks the heel of the arch and permits the material to flow through the feed aperture 36 and the discharge aperture 16. In FIG. 9 the feed aperture 36 has a lesser diameter than the discharge aperture 16, and in FIG. 10 it has a greater diameter. The drive system for the plates 22 may include sequentially operated hydraulic cylinders 60, the piston rods 62 of which engage the periphery of the respective plate 22.

What is claimed is:

1. Apparatus for passing granular material from a first zone to a lower second zone with the assistance of gravity comprising: a shroud; an apertured feed plate disposed in a horizontal plane below said shroud, *a horizon-*

*tal shelf plate below said feed plate, said shelf plate having a discharge aperture of lesser area than the aperture in said feed plate so that a portion of the upper surface of said shelf plate is exposed within the aperture in said feed plate;* and drive means for moving said feed plate in a horizontal orbital path, the relationships among the horizontal dimensions of said shroud and of said feed plate and the radius of said orbital path being such that during orbital movement of said feed plate at least a portion of the peripheral upper surface of said plate extends horizontally beyond the lower end of said shroud.

2. Apparatus as in claim 1 wherein said feed plate includes an upwardly projecting annular dam surrounding the aperture in said feed plate.

3. Apparatus as in claim 1 wherein the lower surface of said feed plate is provided with downwardly extending stud-like elements.

[4. Apparatus as in claim 1 including a horizontal shelf plate below said feed plate, said shelf plate having an aperture of greater area than the area of the aperture in said feed plate.]

[5. Apparatus as in claim 1 including a horizontal shelf plate below said feed plate, said shelf plate having an aperture of lesser area than the area of the aperture in said feed plate.]

6. Apparatus for passing granular material from a first zone to a lower second zone with the assistance of gravity comprising: a shroud; a feed plate having a feed aperture disposed in a horizontal plane below said shroud; a horizontal shelf plate below said feed plate, said shelf plate having a discharge aperture of lesser area than said feed aperture so that a portion of the upper surface of said shelf plate is exposed within said feed aperture; and drive means for moving said feed plate in a horizontal orbital path.

7. Apparatus as in claim 6 wherein said feed plate includes an upwardly projecting annular dam surrounding the aperture in said feed plate.

8. Apparatus as in claim 6 wherein the lower surface of said feed plate is provided with downwardly extending stud-like elements.

9. Apparatus for passing granular material from a first zone to a lower zone with the assistance of gravity comprising: a shroud; a feed plate having a feed aperture disposed in a horizontal plane below said shroud, said feed plate including an upwardly projecting annular dam surrounding said feed aperture; and drive means for moving said feed plate in a horizontal orbital path.

*10. Apparatus for conveying granular material by gravity assist from a mass thereof supported on a horizontal wall provided with a discharge aperture, said apparatus comprising: a shroud disposed above the discharge aperture with at least the lower end of the shroud being disposed within the mass of material; a feed plate disposed between said shroud and said discharge aperture, said feed plate being of smaller horizontal dimensions than said horizontal wall and having at least one vertically facing feed aperture in register with the discharge aperture, said feed aperture being of greater area than said discharge aperture so that a portion of the upper surface of said horizontal wall is exposed within said feed aperture; and means for orbiting said feed plate about a vertical axis in a manner such that the feed aperture remains in register with the discharge aperture and such that a peripheral portion of the feed plate will slide under a quantity of material and then carry at least a portion of that quantity inwardly toward said feed aperture whereby material continuously flows inwardly to said aperture along a path which moves around the periphery of said aperture and whereby the material is then pushed over the edge of the discharge aperture in the form of a continuous stream.*

*11. Apparatus as in claim 10 wherein the horizontal dimension of said feed plate is less than the horizontal dimension of said shroud.*

*12. Apparatus as in claim 10 wherein the horizontal dimension of said feed plate is greater than the horizontal dimension of said shroud.*

*13. Apparatus as in claim 10 wherein said feed plate includes an upwardly projecting annular dam surrounding the feed aperture.*

*14. Apparatus as in claim 10 wherein the lower surface of the feed plate carries downwardly projecting stud-like elements which slidably engage said horizontal wall.*

* * * * *